United States Patent [19]

Bergen

[11] 3,997,243

[45] Dec. 14, 1976

[54] COLOR IMAGE REPRODUCTION SYSTEM

[75] Inventor: Richard F. Bergen, Ontario, N.Y.

[73] Assignee: Xerox Corporation, Stamford, Conn.

[22] Filed: Feb. 20, 1975

[21] Appl. No.: 551,438

[52] U.S. Cl. .............................. 350/161 S; 355/9; 340/173 TP; 350/162 SF; 96/1.1

[51] Int. Cl.² .................. G03G 15/00; G02F 1/23; G02B 5/23

[58] Field of Search .......... 350/161, 162 SF; 355/4, 355/9; 340/173 TP; 96/1.1

[56] References Cited

UNITED STATES PATENTS

| | | | |
|---|---|---|---|
| 3,702,725 | 11/1972 | Macovski | 350/162 SF |
| 3,912,370 | 10/1975 | Roach | 350/161 |
| 3,912,386 | 10/1975 | Gorog et al. | 350/161 X |

*Primary Examiner*—John K. Corbin
*Assistant Examiner*—Rolf Hille
*Attorney, Agent, or Firm*—James J. Ralabate; Michael H. Shanahan; Gaetano D. Maccarone

[57] ABSTRACT

A color image reproduction system wherein there are recorded in superimposition on an imaging member a plurality of images respectively corresponding to the color content of different colors of an original image. Each recorded image is in the form of a surface deformation phase grating which is at a different angular orientation from the phase grating(s) of the other image(s). In operation, the imaging member is sequentially exposed to an original image through spatial light modulating means with illumination of appropriate color at least two times, in each instance employing illumination of a different color and positioning the spatial light modulating means at a different angular orientation. In a preferred embodiment three exposures of the imaging member are made using red, blue, and green light and there is provided a full color reproduction of a full color original image.

17 Claims, 4 Drawing Figures

COLOR IMAGE REPRODUCTION SYSTEM

BACKGROUND OF THE INVENTION

This invention relates generally to a color image reproduction system and, more particularly, to one in which there is employed an imaging member capable of recording screened optical input.

There are known in the art a broad class of imaging members which record optical images by an imagewise distribution of photogenerated voltages or currents acting upon a voltage or current-alterable recording medium. Typically, in these members, imagewise activating radiation incident on a photoconductor allows charge carriers to move in an external electric field. These charge carriers interact with a voltage or current-sensitive member which in turn modulates light. Various materials may be used as the voltage or current alterable recording medium in these members such as, for example, elastomers, liquid crystals, thermoplastics and ferroelectrics.

In copending application Ser. No. 507,910, filed Sept. 20, 1974 the present applicant disclosed a color image reproduction system which utilizes imaging members of the type described above. According to that system an imaging member is exposed to an original image through spatial light modulation means comprising a plurality of differently colored gratings arranged at different angular orientations. In copending applications Ser. Nos. 507,909 and 507,911, both also filed on Sept. 20, 1974, applicant disclosed readout techniques for use with such a color image reproduction system to provide an optical reproduction of the original image.

The present invention relates to a color image reproduction system wherein an imaging member is exposed to screened optical input in which a complex color grating is not required.

SUMMARY OF THE INVENTION

It is therefore an object of this invention to provide a color image reproduction system.

It is another object of the invention to provide a color image reproduction system in which there are recorded in superimposition on an imaging member a plurality of images respectively corresponding to the color content of different colors of an original image wherein each recorded image is in the form of a surface deformation phase grating which is at a different angular orientation from the phase grating(s) of the other image(s).

It is still another object to provide a color image reproduction system capable of providing a full color reproduction of a full color original image.

A further object is to provide a color image reproduction system in which there is utilized an imaging member comprising a voltage or current alterable, light modulating recording medium.

Still further it is an object to provide such a system wherein the imaging member comprises a layer of an elastomer material.

Another object is to provide a system wherein the imaging member comprises a layer of ferroelastic material.

Yet another object is to provide a system wherein the imaging member comprises a layer of a thermoplastic material.

BRIEF SUMMARY OF THE INVENTION

These and other objects and advantages are accomplished in accordance with the invention by providing a color image reproduction system wherein there are recorded in superimposition on an imaging member a plurality of images respectively corresponding to the color content of different colors of an original image. Each recorded image is in the form of a surface deformation phase grating which is at a different angular orientation from the phase grating(s) of the other image(s). In operation, the imaging member is sequentially exposed to an original image through spatial light modulating means with illumination of appropriate color at least two times, in each instance employing illumination of a different color and positioning the spatial light modulating means at a different angular orientation. In a preferred embodiment three exposures of the imaging member are made using red, blue and green light and there is provided a full color reproduction of a full color original image.

BRIEF DESCRIPTION OF THE DRAWINGS

For a better understanding of the invention as well as other objects and further features thereof, reference is made to the following detailed description of various preferred embodiments thereof taken in conjunction with the accompanying drawings wherein.

DESCRIPTION OF THE PREFERRED EMBODIMENTS

Figure 1:
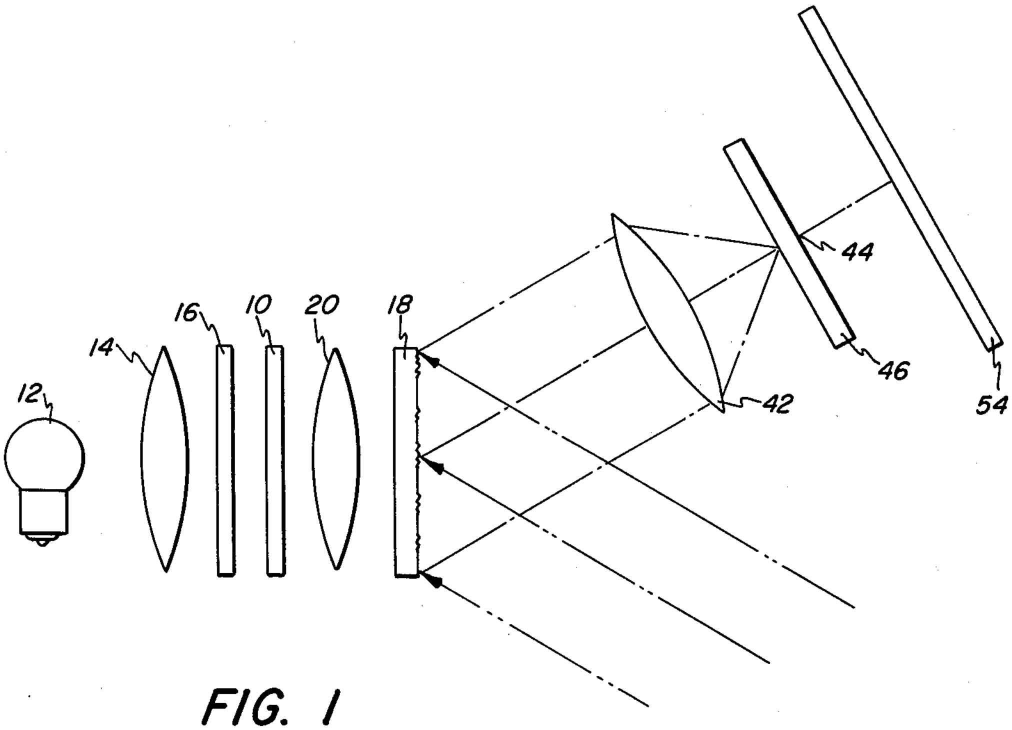
FIG. 1 is a schematic illustration of a color image reproduction system according to the invention.
Figure 2:
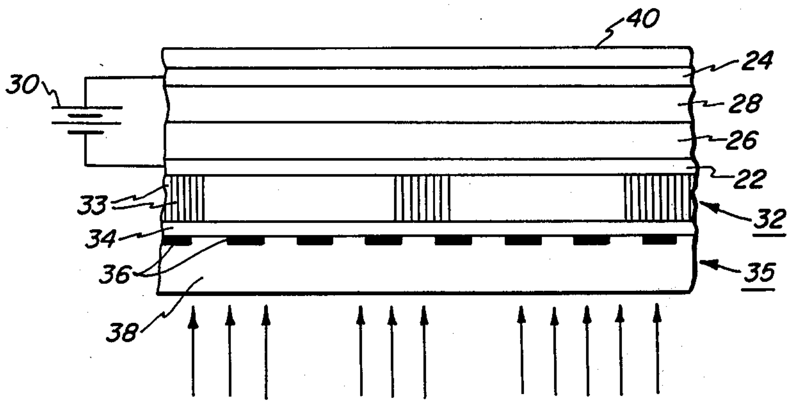
FIG. 2 is a partially schematic, cross-sectional view of an imaging member which may be used in the system of the invention.

In FIG. 1 there is shown in schematic fashion an embodiment of a color image reproduction system according to the invention wherein a color transparency 10 is exposed with light from readin light source 12 through lens 14 and color separation filter 16. The image modulated illumination is focused upon imaging member 18 by lens 20. It should be noted that the color separation filter is used to provide illumination of a single color and is not required when other techniques for providing light of a single color are employed such as, for example, where readin light source 12 comprises a laser. Also, the original image may be an opaque document in which case the imaging member is exposed in the reflection mode. Generally, imaging member 18 may be any which is capable of recording screened color image information. A preferred embodiment of an imaging member which may be used in the present color image reproduction system is shown in FIG. 2 wherein the individual elements are greatly magnified for the purposes of illustration. Referring now to FIG. 2 there is seen an imaging member wherein a substantially transparent conductive layer 22 comprises one electrode of the member and a thin flexible conductive metallic layer 24 comprises another electrode. Sandwiched between the electrodes are photoconductive insulating layer 26 and deformable elastomer layer 28. The electrodes are connected to potential source 30 which may be A.C., D.C. or combinations thereof. It should be noted that the photoconductive material could be incorporated in elastomer layer 28 thus obviating the need for layer 26. Substantially transparent electrode 22 overlies fiber optic element 32 which is adjacent optional index matching liquid layer 34 and spatial light modulating means 35 shown here as a series of lines of light absorbing material 36 on a clear transparent substrate 38 such as, for example, glass. Fiber optic element 32 comprises a plurality of light conducting optical fibers 33 (some of which are shown for purposes of illustration) secured together in side by side relation so that corresponding opposite ends of the fibers cooperate to define first and second faces. Optionally and preferably there may also be provided a transparent layer of an insulating liquid 40 overlying the flexible conductive layer 24. The insulating liquid layer serves an important function when it has an index of refraction different than that of air since its presence over flexible conductive layer 24 means light propagating from above the member for reading out the image formed therein will be modulated more than it would be if only air were present. The insulating liquid layer also serves as protection for flexible conductive layer 24 by isolating it from contamination by dust or the like and maintaining a more constant ambient environment. Typically, a protective layer (not shown) such as a cover glass is arranged over the insulating liquid to keep it in place and free of contamination. It should be noted here that the electrical field may be established by corona charging the upper surface of the imaging member while conductive layer 22 is grounded. In that embodiment flexible conductive layer 24 may be present or it may not. When corona charging is used to establish the electrical field, insulating liquid layer 40 is not present. Many materials of the types useful in layers 22, 24, 26, and 28 are known in the art (see, for example, U.S. Pat. No. 3,716,359) and therefore any extensive discussion of materials for these layers is not required.

Fiber optic element 32 may be electrically insulating or conductive, is typically about ¼ inch thick and typically contains a plurality of light conducting fibers in the range of from about 3 microns to about 20 microns in average diameter. The light conducting fibers are secured together in side-by-side relation so that corresponding opposite ends of the fibers cooperate to define first and second faces. The fibers may be of a variety of shapes including rod-like, thread-like, conical, etc. The fibers may be clad with a variety of materials including a dark colored material which will absorb light escaping from the fibers into the cladding and materials which are non-light absorbing. In one embodiment some of the fibers have a single cladding of light absorbing material and the remainder of the fibers have a single cladding of non-absorbing material as is disclosed in U.S. Pat. No. 3,797,910. There are available fiber optic elements which will transmit ultraviolet radiation; typically these elements transmit visible and near infrared radiation. A slightly reduced image contrast may be obtained because of the cladding; nevertheless, the imaging system of the invention is capable of providing excellent results. It should be noted that the fiber optic element itself may be of a variety of shapes including planar, concave, convex, conical, etc.

It will be seen that the fiber optic element because of the plurality of individual fibers included therein, is itself capable of modulating the image information. However, it is preferred to have the image information modulated by the spatial light modulation means and consequently it is preferred that the size of the fibers be much smaller than the periodicity of the light modulation means to minimize possible destructive optical effects which might otherwise occur.

Spatial modulation means 35 may be any suitable element such as a Ronchi Ruling which is an absorption type line grating having alternating strips, generally equal in width, of light absorbing, or reflecting, and light transmitting areas. The modulation means may have any periodicity. For the elastomer layers typically used in the imaging member illustrated in FIG. 2 a grating having a periodicity of 40 lp/mm or 100 lp/mm is used.

Arranged between spatial light modulation means 35 and fiber optic element 32 is optional index matching liquid layer 34. Layer 34 does away with any air gap which would cause resolution losses and which would typically be present unless special precautions were taken such as, for example, using pressure to force the fiber optic element into intimate contact with the grating. Accordingly, the use of layer 34 constitutes a preferred embodiment of the invention. Layer 34 is chosen so as to have an index of refraction which is relatively close or equal to that of the grating substrate (typically glass) and the glass of the fiber optic bundles (typically about 1.5–1.75). Layer 34 generally has a thickness which is far less than the periodicity of the grating (for example, a 40 lp/lmm grating has a period of 25 microns) and preferably is as thin as possible, for example, about 0.1 to about 2 microns. Generally, any suitable liquid which has an appropriate index of refraction may be used in layer 34. Typical suitable liquids include, for example, alcohols, oils such as 200 Dielectric Fluid available from Dow Corning, water, soaps such as glycerine, and index matching liquids available from Cargille Lab., Inc., Cedar Grove, New Jersey. Generally, layer 34 is from about 0.1 to about 10 microns thick.

In another embodiment of the invention spatial light modulating means 35 is not attached to the fiber optic element but rather an image of the light modulating means is projected upon the fiber optic element. According to this embodiment the transparency can be placed in contact with the bottom surface of the fiber optic element.

In operation of the imaging member an electrical field is established across the photoconductive layer 26 and elastomer layer 28 by applying a potential from source 30 to the electrodes. With the electrical field on the imagewise pattern of activating radiation created by light passing through color separation filter 16 and transparency 10 is focused at the plane between the spatial light modulating means 35 and the bottom surface of fiber optic element 32 by lens 20. Accordingly, an image of the spatial light modulation means and the image information are optically transferred to the photoconductor layer 26-conductive layer 22 interface by the fiber optic element in effect allowing the spatial light modulating means to perform its function as though it were actually located at that interface. The electrical field induces a flow of charge in the regions of the photoconductive layer exposed to radiation thus varying the field across elastomer layer 28. The mechanical force of the electrical field causes the elastomer layer 28 to deform in a pattern corresponding to the spatially modulated image information. The thin conductive layer 24 is sufficiently flexible to follow the deformation of elastomer layer 28. The image formed in the imaging member is in the form of a surface deformation phase grating and is representative of the color content of the original transparency corresponding to the particular color separation filter used in the initial exposure. For example, if a red color separation filter is used, the image recorded in the imaging member corresponds to the red information in transparency 10.

Subsequently, the spatial light modulating means 35 is rotated to a different angular orientation, for example, through an angle of 45°, a differently colored separation filter is substituted in front of transparency 10 and the imaging member is exposed again in the manner previously described. There is thus formed in the imaging member a second image, again in the form of a surface deformation phase grating, superimposed upon the first recorded image. The phase grating which comprises the second recorded image is at a different angular orientation from the phase grating which comprises the first recorded image. This second image is representative of the color content of transparency 10 corresponding to the color of the color separation filter used in the second exposure. It will be understood that images thus formed in the imaging member could be read out at this point. Preferably the imaging member is exposed a third time with the spatial light modulating means 35 rotated to a third angular orientation, for example, through an additional 45° so that the third angular orientation is at an angle of 90° to the orientation of the spatial light modulation means in the first exposure. The three exposure embodiment can provide a full color reproduction of a full color original image when three primary color separation filters are used successively in the exposures.

The illumination used to expose the imaging member in each instance should be of a primary color. Primary colors are those which, in some combination, can be used to provide any other color in the visible spectrum. For example, red, blue and green comprise one set of primary colors and magenta, cyan and yellow another.

The images thus formed may be read out in reflection by a readout system which converts light modulated by the deformed surface to an intensity distribution similar to that of the original transparency and including a fine structure of lines superimposed thereon. If the line structure is objectionable it may be removed by suitable optical filtering techniques well known in the art.

Figure 3:
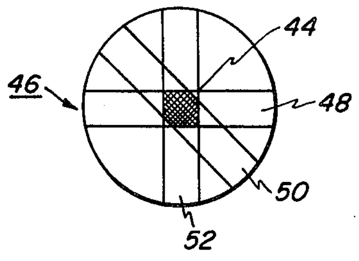
FIG. 3 is a partially schematic, front view of a light filter means which may be used in the color image reproduction system of FIG. 1.

The images formed in imaging member 18 are read out with light from readout illumination system (not shown) which strikes the imaged surface of the imaging member. The readout light which strikes smooth (non-imaged) portions of the imaging member surface (zero order readout light) passes through readout lens 42 and is focused upon the opaque center 44 of light filter means 46 which includes three discrete strips of different color filters oriented properly about the zero order point source image in the Fourier plane of the readout lens 42. Light filter means 46, which is more particularly illustrated in FIG. 3, comprises opaque center 44 and, in this illustrative instance, three strips of differently colored light filter material designated 48, 50, and 52, respectively. By properly orienting light filter means 46 a full color image is formed at the image plane 54. It should be noted that higher diffracted orders may require additional suitable filtering techniques.

A full color image is obtained at image plane 54 by orienting the respective filter strips so as to intercept the diffracted orders of light due to the recorded image which is representative of the color information in transparency 10 which is related to the particular filter strips. For example, if the red color information is recorded at an angle of 0° (i.e., vertically) then filter strip 48 which is oriented horizontally should be red. If the green color information is recorded at an angle of 45° then filter strip 50 is oriented at an angle of 135° and should be green. Where the blue color information is recorded horizontally then vertically oriented filter strip 52 should be blue. With the embodiment described, that is, red, green and blue color separation filters used to filter the respective exposures and red, green, and blue filter strips appropriately arranged in the path of the information modulated readout illumination, the projected image will be a full color reproduction of the transparency 10, that is to say, red areas of the transparency will appear red in the projected image, etc. However, it should be noted that it is possible to practice the color reproduction system in other embodiments such as, for example, where a quasi-color negative reproduction is obtained from a color positive original image or where a quasi-color positive reproduction is obtained from a color negative original image. By "quasi-color negative" or "quasi-color positive" is meant that the reproduced image will display complementary colors for all corresponding color areas of the original with the exception of those areas of the original which are black, white or gray in which case the reproduced image will display the same color as the corresponding areas of the original. For example, a white area on the original will appear white in the reproduced image, etc. Therefore, if red, green and blue color separation filters are used with complementary color filter strips in the readout system a color positive input produces a quasi-color negative output or, conversely, a color negative input produces a quasi-color positive output. Generally, the width of filter strips 48, 50 and 52 is dependent upon the focal length of the readout lens, the frequency of the spatial light modulating means, etc. The filter strips should typically be of a length sufficient to intercept all the diffracted orders of light from imaging member 18.

Although a specific image readout technique has been illustrated it should be noted that the images formed in the imaging member may be read out with any suitable method. Other suitable readout systems are disclosed in copending applications Ser. Nos. 507,909 and 507,911, both filed Sept. 20, 1974, the entire disclosures of which are hereby expressly incorporated by reference herein.

It should be noted that in the full color embodiment described the photoconductor utilized in the imaging member should be panchromatic. Preferably, it should respond about equally to all wavelengths of light in the visible region of the visible spectrum. Panchromatic photoconductors which have low sensitivity in a region of the spectrum may also be employed with satisfactory results by exposing for longer periods of time when light in that region is used. Suitable panchromatic photoconductive insulating materials are disclosed in U.S. Pat. No. 3,655,377. Of course, it will be appreciated that it is possible to practice the advantageous color imaging system in less than a full color mode.

The images formed in the imaging member will typically erase because of any of a number of reasons. For example, charge carriers generated in the photoconductor may reach the photoconductor elastomer interface; or charge carriers present at the photoconductor-elastomer interface may flow laterally; or charge carriers may be injected into the elastomer layer from the photoconductor-elastomer interface and reach the metallic layer. All of these effects cause the contrast potential across the elastomer to diminish or disappear. The images may be erased more quickly by removing the field from across the elastomer layer or by reversing the polarity of the field. For even more rapid erasure, the photoconductor may be flooded with activating electromagnetic radiation at the same time that the field is removed or the polarity thereof reversed.

As noted previously, any imaging member capable of recording screened color image information may be utilized according to the present color image reproduction system. Generally, it is advantageous to spatially modulate image information projected onto deformation imaging members such as for example, frost and relief imaging members where the active element comprises a layer of a surface deformable material such as a thermoplastic resin, and members where the active element comprises a layer of ferroelectric ceramic material, or oil, or elastomer material. Accordingly, deformation imaging members are particularly preferred imaging members for use with the present invention. Deformation imaging members may be read out in reflection, as has been illustrated, and in some embodiments may be read out in transmission. Various suitable imaging members for use according to the invention are described in copending application Ser. No. 507,910 filed Sept. 20, 1974, the entire disclosure of which is hereby incorporated by reference herein.

In another embodiment of the invention conventional black and white photographic film can be used as the imaging member. According to this embodiment the photographic film is exposed to the original multicolor image through a fiber optic element carrying on a surface thereof spatial light modulating means such as has been described. The fiber optic element is attached to the film emulsion with a thin layer of an index matching liquid preferably disposed between them. The film is exposed to an original image through spatial light modulating means with illumination of an appropriate color at least two times as described previously and when developed the resulting transparency is projected through appropriate filters arranged in the Fourier plane as has been described to provide a color reproduction of the original image. The film may be developed in the normal manner, i.e., the developed film appears dark where it was struck by light, or it may be reversal developed in which case the developed film appears dark in the unexposed areas. Similarly, to the embodiment described in FIG. 1 it is possible to obtain a color reproduction of the original image, color positive-quasi color negative or color negative-quasi color positive image reproduction by suitable selection of the color filters used in the readout system.

Figure 4:
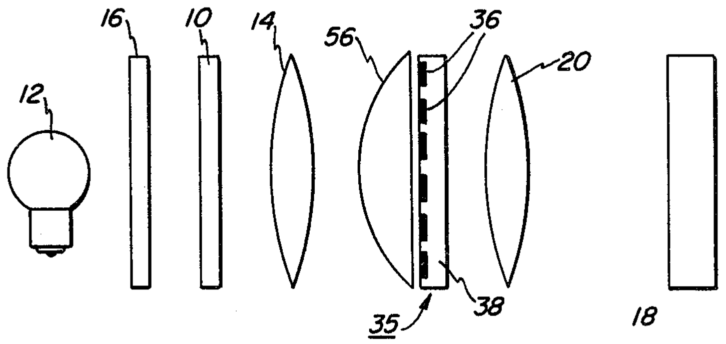
FIG. 4 is a schematic illustration of another embodiment of a color image reproduction system according to the invention.

In another embodiment of the invention an image of the spatial light modulating means is projected upon the imaging member thereby obviating the need for a fiber optic element. This embodiment is illustrated in FIG. 4. A transparency 10 is exposed with light from light source 12 through color separation filter 16 and lens 14 focuses the imagewise light pattern at the plane of spatial light modulating means 35. Field lens 56 directs the imagewise light pattern to lens 20 which focuses the imagewise light pattern and an image of the spatial light modulating means onto the photoreceptor of the imaging member 18. The sequential exposure of the imaging member with the requisite rotation of the spatial light modulation means between each exposure and readout of the recorded images are carried out as previously described.

Although the invention has been described with respect to various preferred embodiments thereof it is not intended to be limited thereto but rather those skilled in the art will recognize that variations and modifications may be made therein which are within the spirit of the invention and the scope of the claims. For example, the optical reproduction of the multicolor original image may be projected upon an apparatus capable of forming a hard copy reproduction thereof such as, for example, a color xerographic copier or the like.

What is claimed is:

1. A color image reproduction method comprising:

a. providing a multicolor original image;

b. providing an imaging member devoid of a color grating capable of recording images in the form of surface deformation phase gratings;

c. exposing said imaging member to a first imagewise pattern of illumination comprising illumination of a first primary color modulated by said original image, wherein said first pattern of illumination is spatially modulated at a first angular orientation; and d. in registration with said first exposure, exposing said imaging member to a second imagewise pattern of illumination comprising illumination of a second primary color modulated by said original image, wherein said second pattern of illumination is spatially modulated at a second angular orientation, whereby there are formed in superimposition on the imaging member a plurality of images in the form of surface deformation phase gratings.

2. The method as defined in claim 1 and further including the step of optically reconstructing the composite image recorded in the imaging member.

3. The method as defined in claim 2 wherein said optically reconstructed image is formed with reflected light.

4. The method as defined in claim 2 wherein said optically reconstructed image is formed with transmitted light.

5. The method as defined in claim 1 and further including the step of exposing in registration with said first and second exposures said imaging member to a third imagewise pattern of illumination comprising illumination of a third primary color modulated by said original image, wherein said third pattern of illumination is spatially modulated at a third angular orientation.

6. The method as defined in claim 5 and further including the step of optically reconstructing the composite image formed in the imaging member.

7. The method as defined in claim 6 wherein said primary colors are red, blue and green.

8. The method as defined in claim 7 wherein said imaging member comprises black and white photographic film.

9. The method as defined in claim 7 wherein said imaging member comprises a layer of an elastomer material and means for establishing an imagewise electrical field across said elastomer layer.

10. The method as defined in claim 9 wherein said imaging member comprises a transparent electrode, a photoconductive layer, an elastomer layer and a flexible conductive metallic layer.

11. The method as defined in claim 10 wherein said imaging member further includes a layer of insulating liquid overlying said flexible conductive metallic layer.

12. The method as defined in claim 11 wherein said imaging member further includes a fiber optic element adjacent said transparent electrode.

13. The method as defined in claim 12 wherein said imaging member further includes spatial light modulating means adjacent said fiber optic element.

14. The method as defined in claim 13 wherein said imaging member further includes a layer of an index matching liquid arranged between said spatial light modulating means and said fiber optic element.

15. The method as defined in claim 1 wherein said imaging member comprises black and white photographic film.

16. The method as defined in claim 1 wherein said imaging member comprises a layer of thermoplastic material and means for establishing an imagewise electrical field across said thermoplastic layer.

17. The method as defined in claim 1 wherein said imaging member comprises a layer of elastomer material and means for establishing an imagewise electrical field across said elastomer layer.

* * * * *